(12) United States Patent  
Burney

(10) Patent No.: US 7,587,537 B1  
(45) Date of Patent: Sep. 8, 2009

(54) SERIALIZER-DESERIALIZER CIRCUITS FORMED FROM INPUT-OUTPUT CIRCUIT REGISTERS

(75) Inventor: Ali Burney, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 11/998,603

(22) Filed: Nov. 30, 2007

(51) Int. Cl.
 *G06F 13/12* (2006.01)
 *H03K 19/177* (2006.01)

(52) U.S. Cl. .......................... 710/71; 710/106; 326/40; 326/86; 341/100

(58) Field of Classification Search ................ 326/86, 326/41; 710/106, 71
See application file for complete search history.

(56) References Cited

U.S. PATENT DOCUMENTS

| | | | |
|---|---|---|---|
| 4,680,733 A | 7/1987 | Duforestel et al. | |
| 5,003,558 A | 3/1991 | Gregg | |
| 5,144,692 A | 9/1992 | Baker et al. | |
| 6,650,140 B2 * | 11/2003 | Lee et al. | 326/39 |
| 6,759,869 B1 * | 7/2004 | Young et al. | 326/41 |
| 6,861,868 B1 * | 3/2005 | Agrawal et al. | 326/38 |
| 6,894,530 B1 * | 5/2005 | Davidson et al. | 326/38 |
| 6,970,013 B1 * | 11/2005 | Cory | 326/38 |
| 7,057,413 B1 * | 6/2006 | Young et al. | 326/41 |
| 7,106,099 B1 * | 9/2006 | Nix | 326/40 |
| 7,218,141 B2 * | 5/2007 | Ng et al. | 326/41 |
| 7,234,017 B2 * | 6/2007 | Biran et al. | 710/315 |
| 7,245,240 B1 * | 7/2007 | Nguyen et al. | 341/100 |
| 7,315,188 B2 * | 1/2008 | Wang et al. | 327/108 |
| 7,348,796 B2 * | 3/2008 | Crouch et al. | 326/38 |

* cited by examiner

*Primary Examiner*—Vibol Tan
(74) *Attorney, Agent, or Firm*—Treyz Law Group; G. Victor Treyz

(57) ABSTRACT

Input-output circuitry for integrated circuits such as programmable logic device integrated circuits is provided. The input-output circuitry can be configured to operate in a single-ended data mode or a serializer-deserializer mode using programmable routing circuitry such as programmable multiplexers. In single-ended data mode, data registers in the single-ended input-output circuitry may be used to handle transmitted and received single-ended data. In serializer-deserializer mode, the data registers may be configured to form a shift register. The shift register may be used in a serializer-deserializer circuit. Parallel-to-serial and serial-to-parallel data conversion operations may be performed using the shift register. The serializer-deserializer circuit may be connected to differential input-output circuitry such as a differential transmitter circuit or a differential receiver circuit. The data registers may be configured to operate as positive-edge-triggered or negative-edge-triggered devices.

15 Claims, 11 Drawing Sheets

SERIALIZER-DESERIALIZER CIRCUITS FORMED FROM INPUT-OUTPUT CIRCUIT REGISTERS

BACKGROUND

This invention relates to integrated circuits, and more particularly, to selectively forming serializer-deserializer circuitry from registers in input-output circuits on an integrated circuit.

Integrated circuits are often used to handle both single-ended and differential data signals. Single-ended signals are referenced to ground. In differential data signals, the voltages on a pair of lines are referenced to each other. Differential data signaling schemes such as the well-known low-voltage differential signaling (LVDS) scheme are commonly used to handle signals in the GHz frequency range. The use of differential data signaling schemes can help system designers to overcome noise problems. Single-ended data signaling schemes tend to be used at lower data rates, where noise immunity is less of an issue.

Integrated circuits that contain differential communications circuitry typically contain serializer-deserializer circuitry. This circuitry, which is sometimes referred to as SERDES circuitry, is used to convert high-speed incoming serial data streams into lower-speed parallel data streams. SERDES circuitry is also used to convert parallel data to serial data prior to data transmission to another integrated circuit using a differential output driver. SERDES circuitry includes shift registers that are formed from a number of individual data registers.

In serial-to-parallel operation (e.g., when incoming serial data is being processed), serial data is clocked into the shift register in a SERDES circuit using a high speed serial clock. Once the shift register is full, the data is shifted out of the shift register in parallel using a lower-speed parallel clock.

In parallel-to-serial operation (e.g., when transmitting serial data), bits of parallel data are shifted into the shift register in parallel using the parallel clock. A corresponding serialized data stream is then provided at the serial output of the shift register at the serial clock rate.

In conventional integrated circuits, the shift registers in SERDES circuit blocks are hardwired. This type of arrangement may provide acceptable serial-to-parallel and parallel-to-serial data conversion performance, but can be inefficient. For example, if the SERDES capabilities of the integrated circuit are not used by a logic designer, the resources used by the shift register are wasted and represent needless overhead.

In certain types of integrated circuits such as programmable logic devices, it may be possible to use general purpose programmable logic resources such as logic element register resources to selectively implement serializer-deserializer circuitry. This type of arrangement may provide design flexibility, but can limit performance due to routing delays. This type of arrangement may also have high implementation costs and can reduce the amount of programmable circuitry that would otherwise be available to implement a user's custom logic design.

It would therefore be desirable to provide integrated circuits in which serial-deserializer circuitry may be selectively formed from available register resources.

SUMMARY

In accordance with the present invention, input-output circuitry for integrated circuits such as programmable logic device integrated circuits is provided. The input-output circuitry serves as an interface between core logic and input-output pins on an integrated circuit. The input-output circuitry can be configured to operate in a single-ended data mode or a serializer-deserializer mode. Programmable routing circuitry such as programmable multiplexer circuitry may be included in the input-output circuitry. The programmable multiplexers or other routing circuitry may be used to selectively form paths in the input-output circuitry based on loaded configuration data.

In single-ended data mode, data registers in the single-ended input-output circuitry may be used to handle transmitted and received single-ended data. Single-ended data is referenced to ground.

In serializer-deserializer mode, the data registers may be configured to form a shift register. For example, configuration data may be loaded into an integrated circuit that configures the programmable multiplexers so that pathways are formed that chain together multiple data registers from the input-output circuitry to form the shift register. The data registers may be configured to operate as positive-edge-triggered or negative-edge-triggered devices.

Shift registers that have been formed from input-output circuit data registers may be used in serializer-deserializer circuits. In particular, in a serializer-deserializer circuit, a shift register may be used to perform parallel-to-serial or serial-to-parallel data conversion operations. The serializer-deserializer circuit may be connected to differential input-output circuitry such as a differential transmitter circuit or a differential receiver circuit.

Further features of the invention, its nature and various advantages will be more apparent from the accompanying drawings and the following detailed description.

DETAILED DESCRIPTION

The present invention relates to input-output circuitry on integrated circuits. The integrated circuits may be any suitable type of integrated circuits such as microprocessors, digital signal processors, or application specific integrated circuits. The integrated circuits that contain the input-output circuitry may also be programmable integrated circuits. Examples of programmable integrated circuits include programmable logic devices (also sometimes referred to as field-programmable gate arrays) and integrated circuits that have programmable circuitry, but which are not typically referred to as programmable logic devices, such as microprocessors, digital signal processors, or application specific integrated circuits that contain programmable circuitry.

The input-output circuitry is sometimes described herein in the context of programmable integrated circuits such as programmable logic devices as an example. Programmable logic device integrated circuits and other programmable integrated circuits can be customized using configuration data. In a typical scenario, a logic designer uses a computer-aided design (CAD) system in designing a desired logic circuit. The computer-aided design system uses information on the hardware capabilities of a programmable circuit to generate configuration data.

Programmable logic devices and other programmable circuits contain programmable elements. The programmable elements may be based on any suitable programmable technology such as fuses, antifuses, laser-programmed elements, electrically-programmed elements, nonvolatile memory elements such as electrically-programmed polysilicon fuses, volatile memory elements, mask-programmed elements, etc. Mask-programmed devices may be programmed during device fabrication. In a typical scenario, volatile programmable elements are based on random-access memory (RAM) cells and nonvolatile fuses such as electrically-programmable polysilicon fuses.

To customize a typical programmable logic device such as a RAM-based device to implement a desired logic circuit, configuration data produced by a computer-aided design system is loaded into programmable memory elements on the device. During operation of the programmable logic device, each memory element provides a static output signal based on its loaded configuration data. The outputs signals from the memory elements are applied to n-channel and p-channel metal-oxide-semiconductor transistors in regions of programmable logic on the programmable logic device. This configures the programmable logic of the device so that the programmable logic device implements the desired logic circuit. Nonvolatile memory elements within the device may be configured during manufacturing to adjust circuits so that they perform within desired specifications (as an example).

Figure 1:
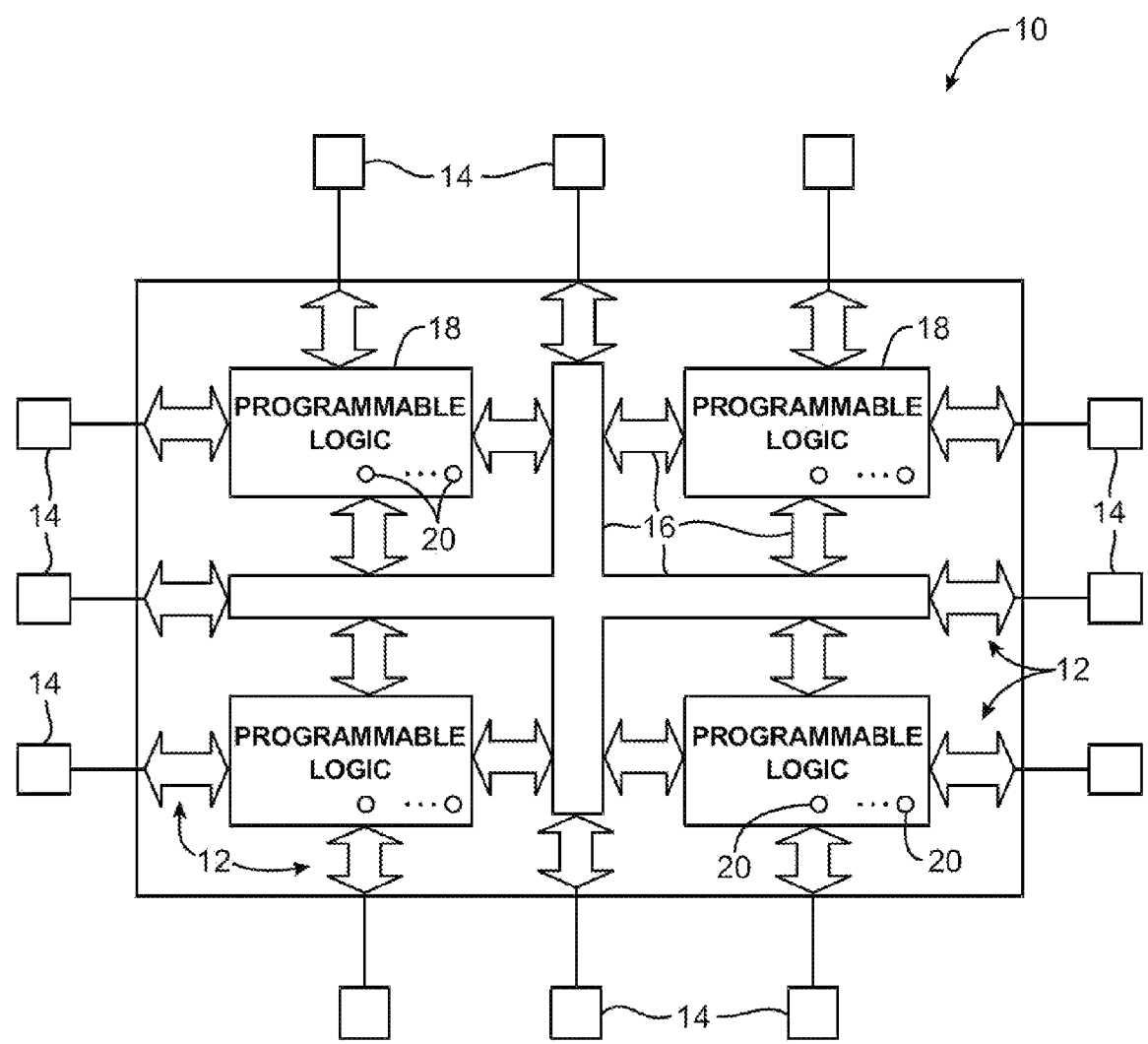
FIG. 1 is a diagram of an illustrative integrated circuit such as a programmable logic device integrated circuit in accordance with an embodiment of the present invention.

An illustrative integrated circuit 10 in accordance with the present invention is shown in FIG. 1. Integrated circuit 10 may be a programmable logic device integrated circuit. Programmable logic device 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 may include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function. Interconnection resources 16 and input-output circuitry 12 may contain programmable logic components (e.g., programmable multiplexers, programmable registers, etc.) and may therefore be considered to form a type of programmable logic.

Programmable logic device 10 may contain programmable elements 20 such as random-access memory cells. Programmable elements 20 (e.g., volatile elements such as random-access memory cells) can be loaded with configuration data (also called programming data) using pins 14 and input-output circuitry 12. The programmable elements each provide a corresponding static control output signal that controls the state of an associated logic component in programmable logic 18. The programmable element output signals are typically used to control the gates of metal-oxide-semiconductor (MOS) transistors. Most of these transistors are generally n-channel metal-oxide-semiconductor (NMOS) pass transistors in programmable components such as multiplexers, look-up tables, logic arrays, AND, OR, NAND, and NOR logic gates, etc. When a programmable element output is high, the pass transistor controlled by that programmable element is turned on and passes logic signals from its input to its output. When the programmable element output is low, the pass transistor is turned off and does not pass logic signals.

The programmable elements may be loaded from any suitable source. In a typical arrangement, the programmable elements are loaded from an external erasable-programmable read-only memory and control chip called a configuration device via pins 14 and input-output circuitry 12. Nonvolatile programmable elements may be laser-programmed or electrically programmed during manufacturing using programming equipment or on-chip circuits (as examples).

The circuitry of device 10 may be organized using any suitable architecture. As an example, the logic of programmable logic device 10 may be organized in a series of rows and columns of larger programmable logic regions (sometimes referred to as logic array blocks) each of which contains multiple smaller logic regions (sometimes referred to as logic elements). The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Still other device arrangements may use logic that is not arranged in rows and columns.

Figure 2:
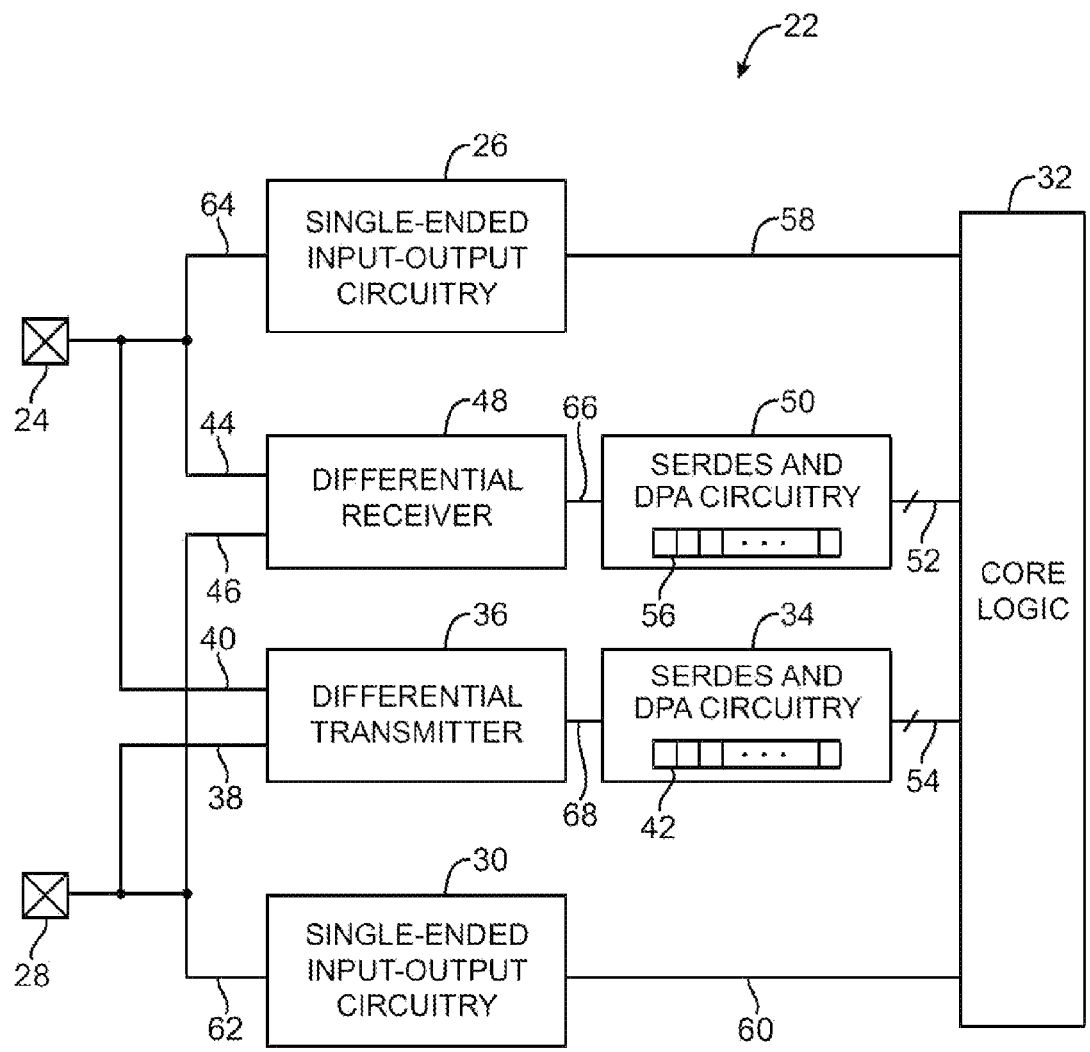
FIG. 2 is a circuit diagram of conventional input-output circuitry on a programmable logic device integrated circuit.

Conventional input-output circuitry 22 of the type that has been used in programmable logic devices is shown in FIG. 2. Only two input-output pins (pins 24 and 28) are shown in FIG. 2 to avoid over-complicating the drawing. In a typical programmable logic device, there may be numerous input-output pins.

The input-output circuitry of FIG. 2 may be operated in a single-ended signaling mode or a differential signaling mode. In single-ended mode, single-ended input-output circuits such as single-ended input-output circuitry 26 and 30 may be used to handle signals. For example, circuitry 26 may be used to handle single-ended data signals that have been received at pin 24 and that have been conveyed to circuitry 26 over path 64. The received signals may be provided to core logic 32 (the main and centrally located hardwired logic and programmable logic on the integrated circuit) via path 58. Single-ended data signals that are produced by core logic 32 may be provided to circuitry 26 over path 58 and may be transmitted to another integrated circuit using circuitry 26, path 64, and input-output pin 24.

Single-ended input-output circuitry 30 may operate similarly. Incoming single-ended data signals may be conveyed from input-output pin 28 to single-ended input-output circuitry 30 over path 62. Single-ended input-output circuitry 30 may convey the received data signals to core logic 32 over path 60. During transmit operations, core logic 32 may provide single-ended data signals to single-ended input-output circuitry 30 over path 60. Single-ended input-output circuitry 30 may transmit these signals to external circuitry via path 62 and input-output pin 28.

When operated differentially, differential data signals may be transmitted and received using a pair of input-output pins (i.e., pins 24 and 28).

Differential data may be received using differential receiver 48 (i.e., an LVDS receiver). Pins 24 and 28 may be coupled to the differential input of receiver 48 using paths 44 and 46, respectively. Differential receiver circuitry 48 may convert the incoming differential data signal on a pair of data lines connected to pins 24 and 28 into a single-ended data signal on path 66. Serializer-deserializer and dynamic clock phase alignment circuitry 50 may be used to convert the serial data on path 66 into parallel data on path 52. The parallel data on path 52 may be received by core logic 32.

Differential data may be transmitted using differential transmitter 36. Parallel data from core logic 32 may be provided to serializer-deserializer and dynamic clock phase alignment circuitry 34 via parallel data path 54. Circuitry 34 may serialize the parallel data to produce a corresponding serial data stream on path 68. Differential transmitter 36 (i.e., an LVDS transmitter) can convert the serial single-ended data on path 68 into differential data on a pair of output lines such as lines 38 and 40. Lines 40 and 38 may be coupled to input-output pins 24 and 28, respectively.

The serial-to-parallel data conversion functions of SERDES circuitry 50 are implemented using shift register circuitry 56. Circuitry 56 includes multiple registers connected in series with fixed connections to form a shift register. Serial data is clocked into the shift register using a high-speed ("serial") clock. Once the shift register has been loaded, the data can be shifted out of the shift register in parallel over path 52 using a slower ("parallel") clock. If there are ten lines in path 52, for example, the parallel clock will be ten times slower than the serial clock.

The parallel-to-serial data conversion functions of SERDES circuitry 34 also use shift register circuitry. In particular, a shift register 42 may be used to convert parallel data on path 54 into serial data on path 68. Parallel data is shifted into the shift register using the parallel clock. The corresponding serialized version of this data is clocked out of shift register circuitry 42 on path 68 at the serial clock rate.

To ensure adequate performance, shift registers 56 and 42 are typically formed from dedicated (hardwired) circuits. In situations in which the programmable logic device is being used to implement a custom logic circuit that does not require the SERDES capabilities of circuits 50 and 34, shift register circuits 56 and 42 are not used and create needless overhead. In some conventional programmable logic devices, shift-registers 56 and 42 can be formed from registers in programmable logic elements. Using general-purpose programmable logic resources in this way can lead to suboptimal performance, because such circuitry generally switches more slowly than hardwired circuitry in an input-output block due to the need to route signals through interconnect resources between logic elements. As a result, the use of general-purpose core logic such as logic element registers to form shift register circuits 56 and 42 may not always be desirable.

Figure 3:
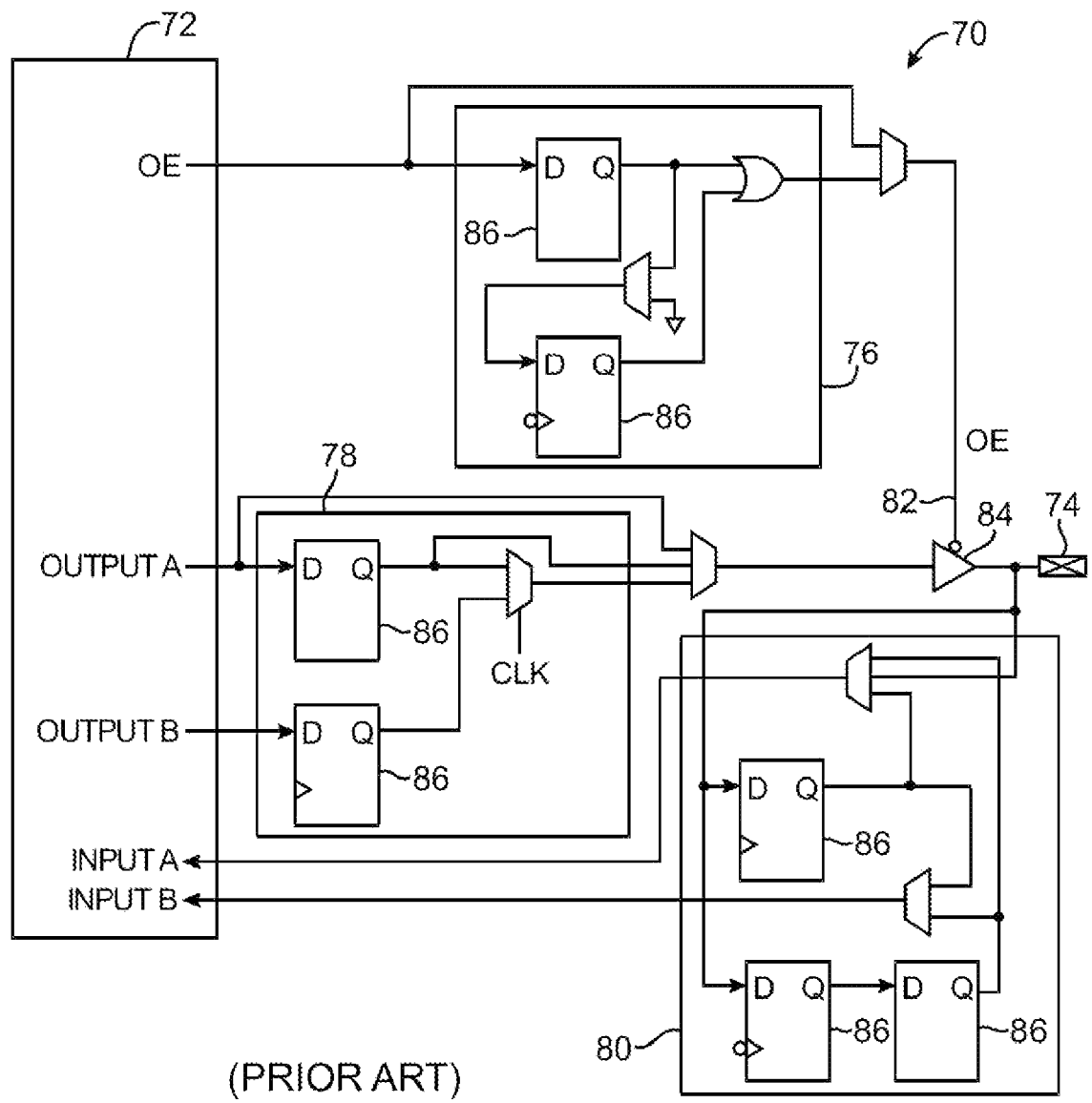
FIG. 3 is a circuit diagram of conventional single-ended input-output circuitry on a programmable logic device integrated circuit.

Single-ended input-output circuitry such as input-output circuitry 26 and 30 is shown in more detail as single-ended input-output circuitry 70 of FIG. 3. As shown in FIG. 3, conventional single-ended input-output circuitry 70 may be used to convey data between core logic 72 and input-output pin 74. Circuitry 70 includes an output enable (OE) control block 76, a single data rate to double data rate conversion block 78, and a double data rate to single data rate conversion block 80. Output enable signal OE is applied to control input 82 of buffer 84. When OE is low, pin 74 may be used for output data. When OE is high, buffer 84 is tristated so that input data may be received on pin 74. Output signals from core logic 72 may be passed to pin 74 via block 78. Input signals from pin 74 may be passed to core logic 72 via block 80.

Circuit blocks 76, 78, and 80 contain registers 86. The data paths that are associated with registers 86 only allow registers 86 to be used for their intended functions (i.e., to control output enable signal OE or to convert between single and double data rate data).

Figure 4:
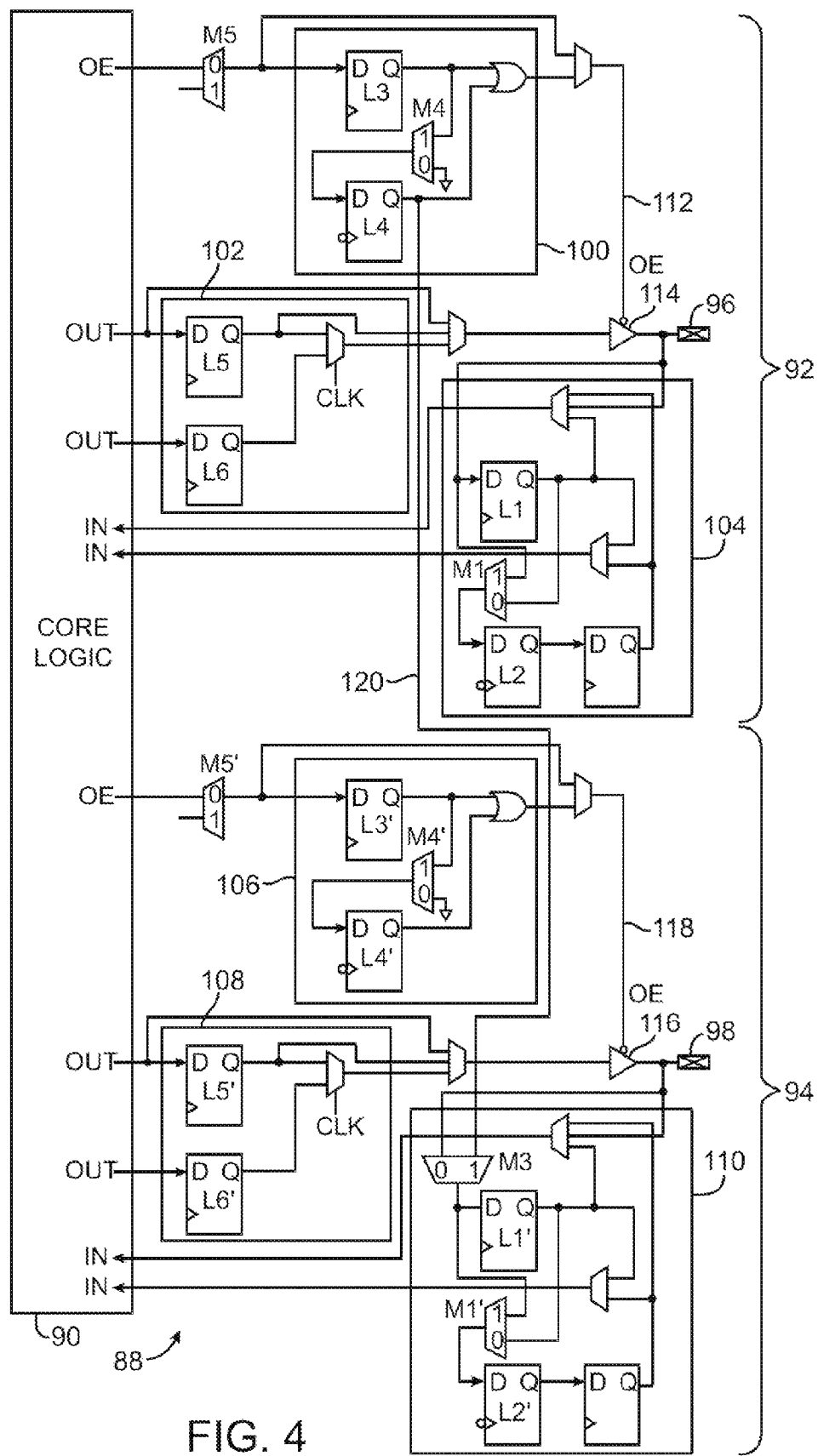
FIG. 4 is a circuit diagram of illustrative single-ended input-output circuitry containing multiplexer circuitry and register circuitry that may be selectively configured to implement serializer-deserializer circuitry for handling high-speed differential data in accordance with an embodiment of the present invention.

Illustrative single-ended input-output circuitry 88 in accordance with an embodiment of the present invention is shown in FIG. 4. As shown in FIG. 4, circuitry 88 may be used to convey signals between core logic 90 (e.g., programmable and fixed core circuitry in a programmable logic device or other integrated circuit) and input-output pins such as pins 96 and 98. Only two input-output pins and their corresponding single-ended data input-output circuitry are shown in the example of FIG. 4 to avoid over-complicating the drawing. In general, however, an integrated circuit may have any suitable number of input output pins and corresponding input-output circuits (see, e.g., input-output pins 14 and input-output circuitry 12 of FIG. 1).

Circuitry 88 may be arranged in two blocks. Single-ended input circuitry 92 may be used to convey signals between core logic 90 and input-output pin 96. Single-ended input circuitry 94 may be used to convey signals between core logic 90 and input-output pin 98. Each pair of input-output pins such as input-output pins 96 and 98 may be connected to a differential receiver such as differential receiver 48 of FIG. 2 and may be connected to a differential transmitter such as differential transmitter 36 of FIG. 2. These differential input-output circuits are not shown in FIG. 4 to avoid over-complicating the drawings.

To conserve resources, data registers in single-ended input-output circuit blocks 92 and 94 may be configured to implement shift registers such as shift registers 56 and 42 when it is desired to implement serializer-deserializer (SERDES) circuits such as SERDES circuits 50 and 34 of FIG. 2 on device 10. In situations in which a logic designer does not need the functions of the SERDES circuits, the shift registers need not be implemented and the registers of circuitry 88 may be used to handle single-ended data as described in connection with FIG. 2.

Any suitable circuitry may be used to selectively form SERDES shift registers from the data registers in single-ended data signal input-output circuitry 88. With one suitable arrangement, which is described herein as an example, programmable multiplexer circuitry is used to selectively connect data registers in a chain to form a SERDES shift register. This is, however, merely illustrative. Any suitable configurable routing arrangement may be used to form shift registers from the input-output circuit data registers if desired.

In the example of FIG. 4, single-ended input-output circuit 92 contains output-enable control circuit 100, single data rate to double data rate conversion circuit 102, and double data rate to single data rate conversion circuit 104. Single-ended input-output circuit 94 contains output-enable control circuit 106, single data rate to double data rate conversion circuit 108, and double data rate to single data rate conversion circuit 110.

A programmable multiplexer M5 may be used to selectively convey signals from core logic 90 to the input of circuit 100. Circuit 100 contains data registers L3 and L4 and a programmable multiplexer M4. The output enable signal OE that is supplied by circuit 100 on line 112 is used to control the state of tristate buffer 114. When signal OE on line 112 is low, buffer 114 is enabled and circuit 92 may be used to supply data to input-output pin 96. When signal OE on line 112 is high, buffer 114 is tristated and circuit 92 may be used to convey data from input-output pin 96 to core logic 90.

Single-ended input-output circuit 92 may use single data rate to double data rate conversion circuit 102 to convey output data from core logic 90 to input-output pin 96. Double data rate to single data rate conversion circuit 104 may include programmable multiplexer circuitry such as programmable multiplexer M1. Double data rate to single data rate conversion circuit 104 of circuit 92 may be used to convey input data from input-output pin 96 to core logic 90.

A programmable multiplexer M5' may be used to selectively convey signals from core logic 90 to the input of circuit 106. Circuit 106 may contain a programmable multiplexer M4'. Single-ended input-output circuit 94 may use output enable control block 106 to control the state of buffer 116. When signal OE on line 118 is low, buffer 116 may be enabled to allow output data to be passed to input-output pin 98. When signal OE on line 118 is high, buffer 116 may be tristated so that input data from input-output pin 98 may be conveyed to core logic 90.

Circuit 108 may be used to convert single data rate data from core logic 90 into double data rate data. The double data rate data may be conveyed to input-output pin 98 via output buffer 116 when output buffer 116 is enabled by signal OE on path 118.

Double data rate to single data rate conversion circuit 110 may include multiplexer circuitry such as programmable multiplexer M3 and programmable multiplexer M1. Double data rate to single data rate conversion circuit 110 of circuit 94 may be used to convey input data from input-output pin 98 to core logic 90.

The input-output circuit multiplexers such as multiplexers M5, M5', M4, M4', M1, M1', and M3 in the illustrative arrangement of FIG. 4 may be configurable. With one suitable arrangement, one of programmable elements 20 may be associated with each multiplexer. When that programmable element contains a logic one, the multiplexer is configured to connect its "1" input to its output. When the programmable element contains a logic zero, the multiplexer is configured to connect is "0" input to its output.

Figure 5:
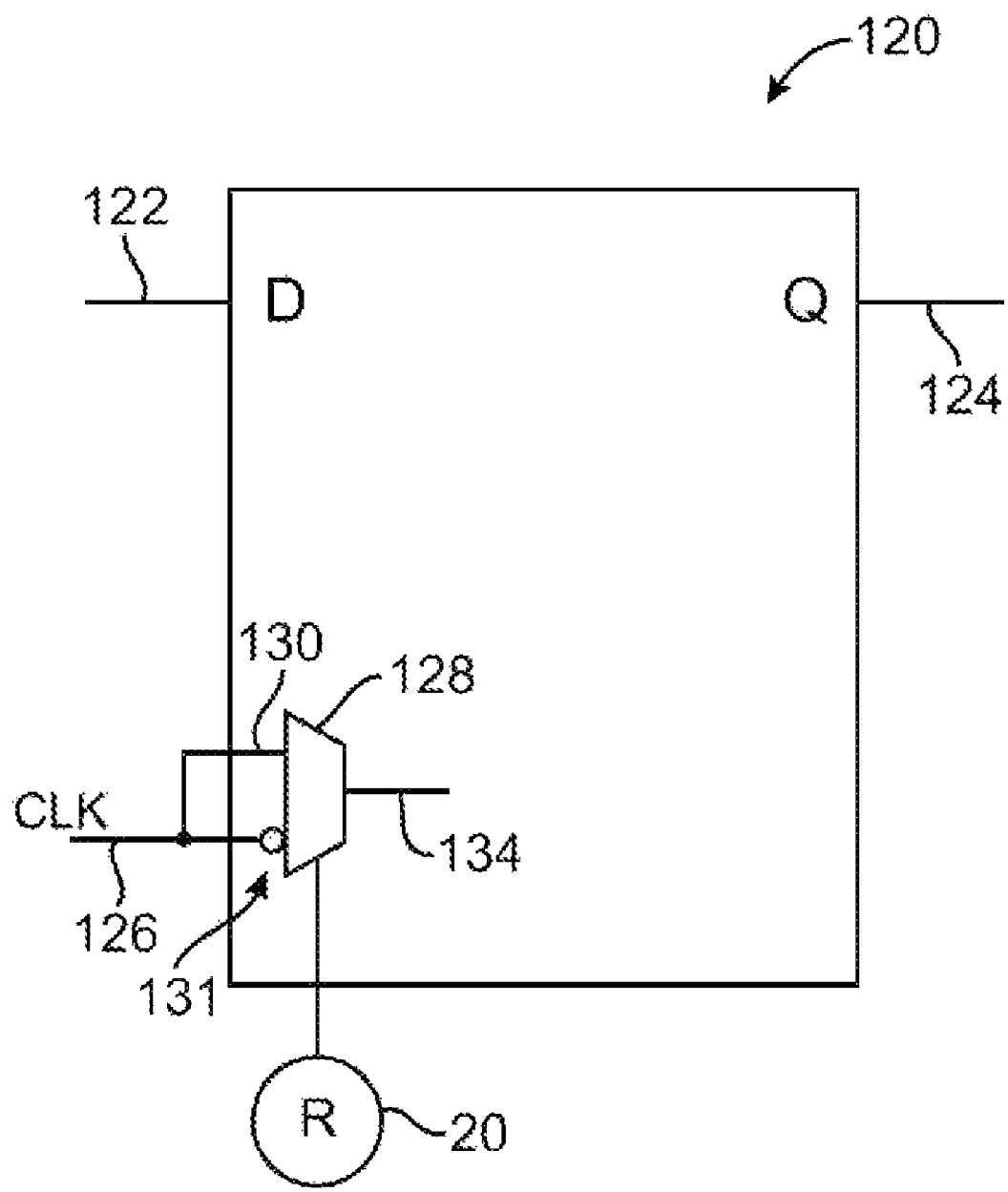
FIG. 5 is a diagram of an illustrative register that may be configured to operate as a positive-edge-triggered register or a negative-edge-triggered register in accordance with an embodiment of the present invention.

The data registers in circuitry 88 may also be programmable. As shown in FIG. 5, for example, each data register such as illustrative data register 120 may have a data input 122 (D), a data output 124 (Q), and a clock input 126 (CLK). A multiplexer 128 or other configurable circuitry may be used to place data register 120 into positive-edge-triggered mode or negative-edge-triggered mode. As shown in FIG. 5, the state of multiplexer 128 may be controlled by a control signal that is supplied from a corresponding programmable element 20. One of the inputs of multiplexer 128 (i.e., input 130) is non-inverting. The other input to multiplexer 128 (i.e. input 131) is inverting). Clock line 134 can be configured to be either inverting or non-inverting depending on the state of the configuration data bit stored in programmable element 20. The state of the configuration data bit in element 20 may therefore be used to place data register 120 in either positive edge triggered mode or negative edge triggered mode. If desired, some or all of the data registers in circuit 88 of FIG. 4 may operate in a fixed mode (i.e., positive edge triggered or negative edge triggered).

The multiplexer circuitry and data registers of single-ended input-output circuitry 88 of FIG. 4 may be used to selectively form SERDES shift registers for handling received and transmitted differential data when desired. Path 120 and programmable multiplexer circuitry such as programmable multiplexer M3 in the example of FIG. 4 may be used to connect adjacent single-ended input-output circuit blocks such as blocks 92 and 94. This allows shift registers to be formed using the data registers in more than one input-output circuit block.

Figure 6:
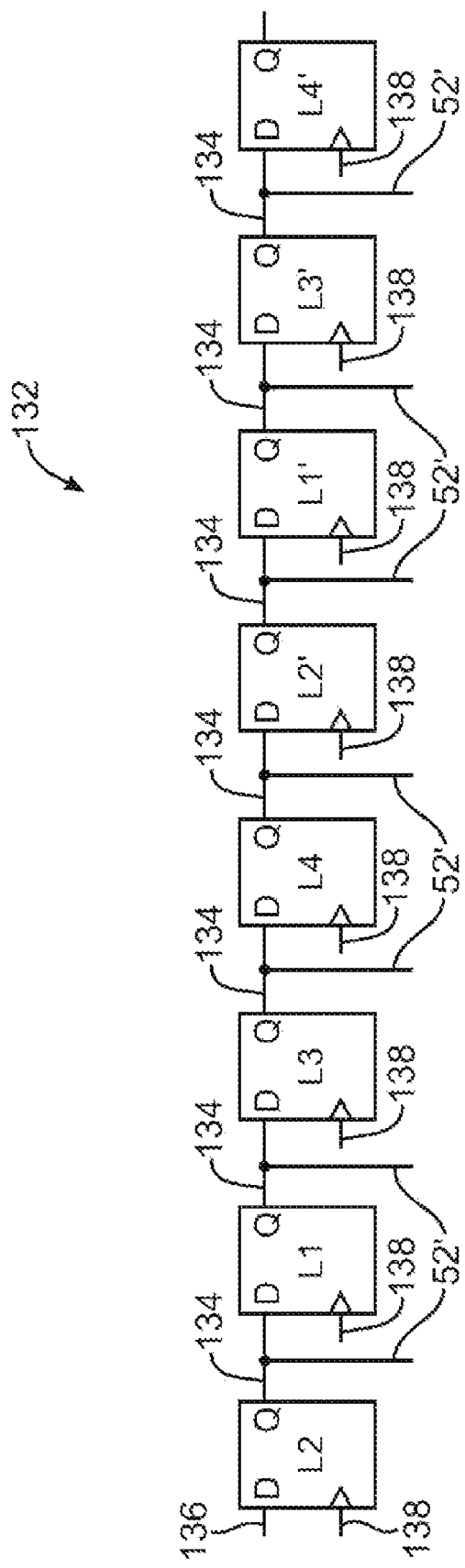
FIGS. 6-10 are diagrams showing how register and multiplexer circuitry in input-output circuitry on an integrated circuit may be selectively configured to implement serializer-deserializer shift registers in accordance with an embodiment of the present invention.

An illustrative shift register 132 of the type that may be formed from data registers in single-ended input-output circuitry on an integrated circuit such as integrated circuit 10 of FIG. 1 is shown in FIG. 6. Shift register 132 may be used to perform the SERDES functions of a circuit such as SERDES circuit 50 of FIG. 2. In the example of FIG. 6, the data registers have been selectively interconnected by programming the multiplexers of circuit 88 using configuration data loaded into associated programmable elements 20. The connections formed by the fixed paths and programmed multiplexers of FIG. 4 are represented by lines 134 in FIG. 6.

Serial input data is received at input 136 to data register L2 (e.g., from the output of a differential receiver such as receiver 48 of FIG. 2). Parallel data output paths 52' are used to convey data that has been converted from serial to parallel by shift register 132 to core logic 90. Clock inputs 138 may receive a high-speed ("serial") clock signal. A corresponding slower ("parallel") clock may be used in shifting out data from shift register 132 in parallel on lines 52'. If, for example, there are eight lines 52' (i.e., because shift register 132 is performing an 8:1 serial-to-parallel conversion), the parallel clock will be eight times slower than the serial clock. As shown in FIG. 6, when configured to form shift register 132 (in SERDES mode), the data registers of circuitry 88 may be interconnected by the programmable multiplexers in the following order: L2, L1, L3, L4, L2', L1', L3', and L4'. If desired, circuitry 88 may be placed in standard single-ended mode by reconfiguring the programmable multiplexer connections. In standard single-ended mode, circuit blocks 92 and 94 of circuitry 88 of FIG. 4 may operate in the same way as conventional single-ended input-output circuit block 70 of FIG. 3 (as an example).

Figure 7:
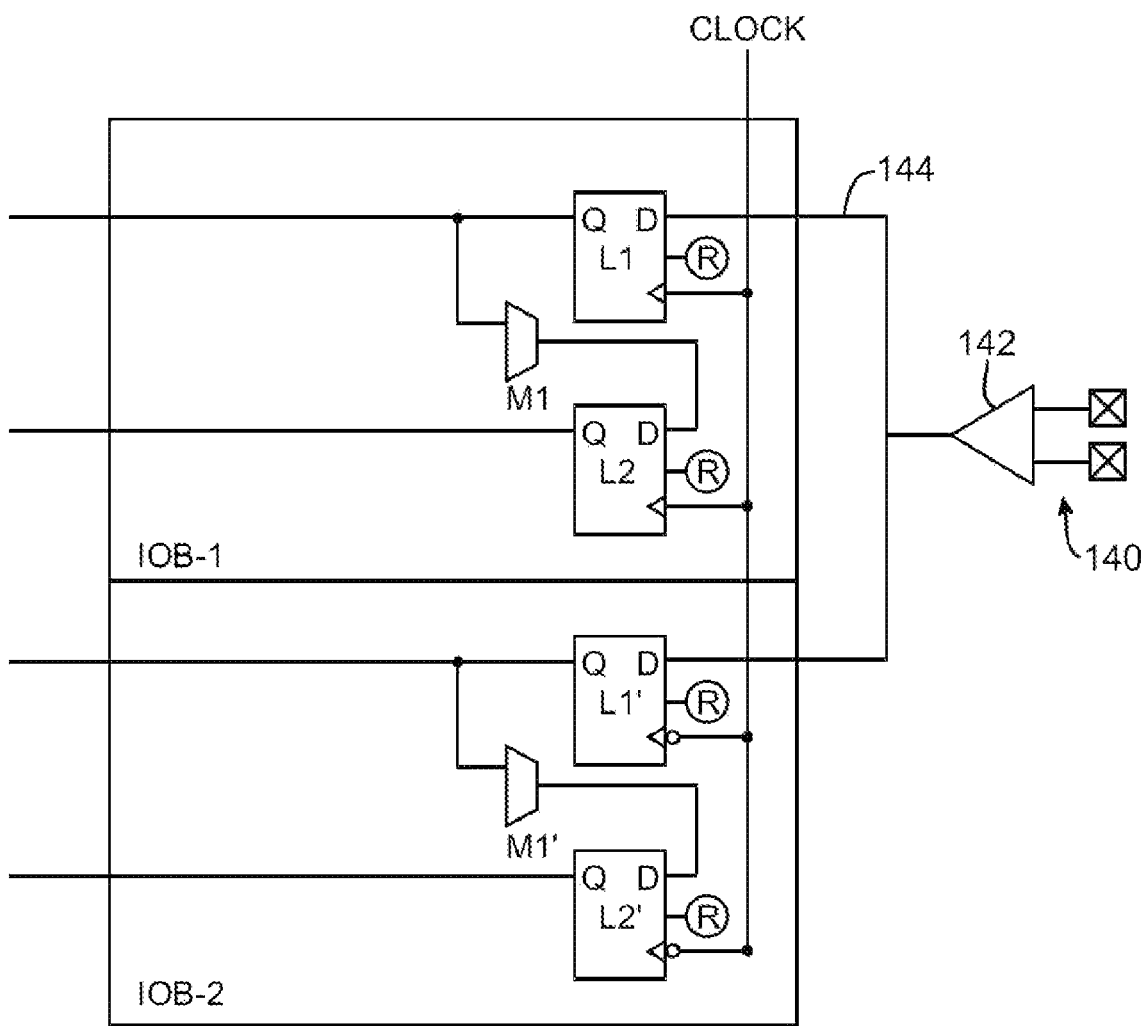

If desired, programmable multiplexer circuitry and data registers in single-ended input-output circuits can be configured to implement other types of shift registers. In the example of FIG. 7, single-ended input-output circuit block IOB-1 and single-ended input-output circuit block IOB-2 include programmable multiplexers M1 and M1' and programmable data registers L1, L2, L1', and L2'. By loading configuration data into the programmable elements associated with registers L1, L2, L1', L2', and multiplexers M1 and M1', the circuitry of FIG. 7 may be selectively placed into a single-ended data mode or a SERDES mode.

In single-ended mode, input-output blocks IOB-1 and IOB-2 (which may be, for example, single-ended input-output circuits of the type illustrated by blocks 92 and 94 of FIG. 4), can be used to handle single-ended data on path 144. Data on path 144 may be produced at the output of differential-to-single-ended input buffer 142 (i.e., a differential receiver) in response to differential data signals on paths 140.

In SERDES mode, data registers L1 and L2 may be configured as positive-edge-triggered registers and data registers L1' and L2' may be configured as negative edge triggered registers. Multiplexers M1 and M1' may be configured so that registers L1, L2, L1', and L2' form a 4:1 shift register in which data is routed in series to perform serial-to-parallel conversion. The 4:1 shift register may be used to perform the SERDES functions of a circuit such as SERDES circuit 50 of FIG. 2.

Figure 8:
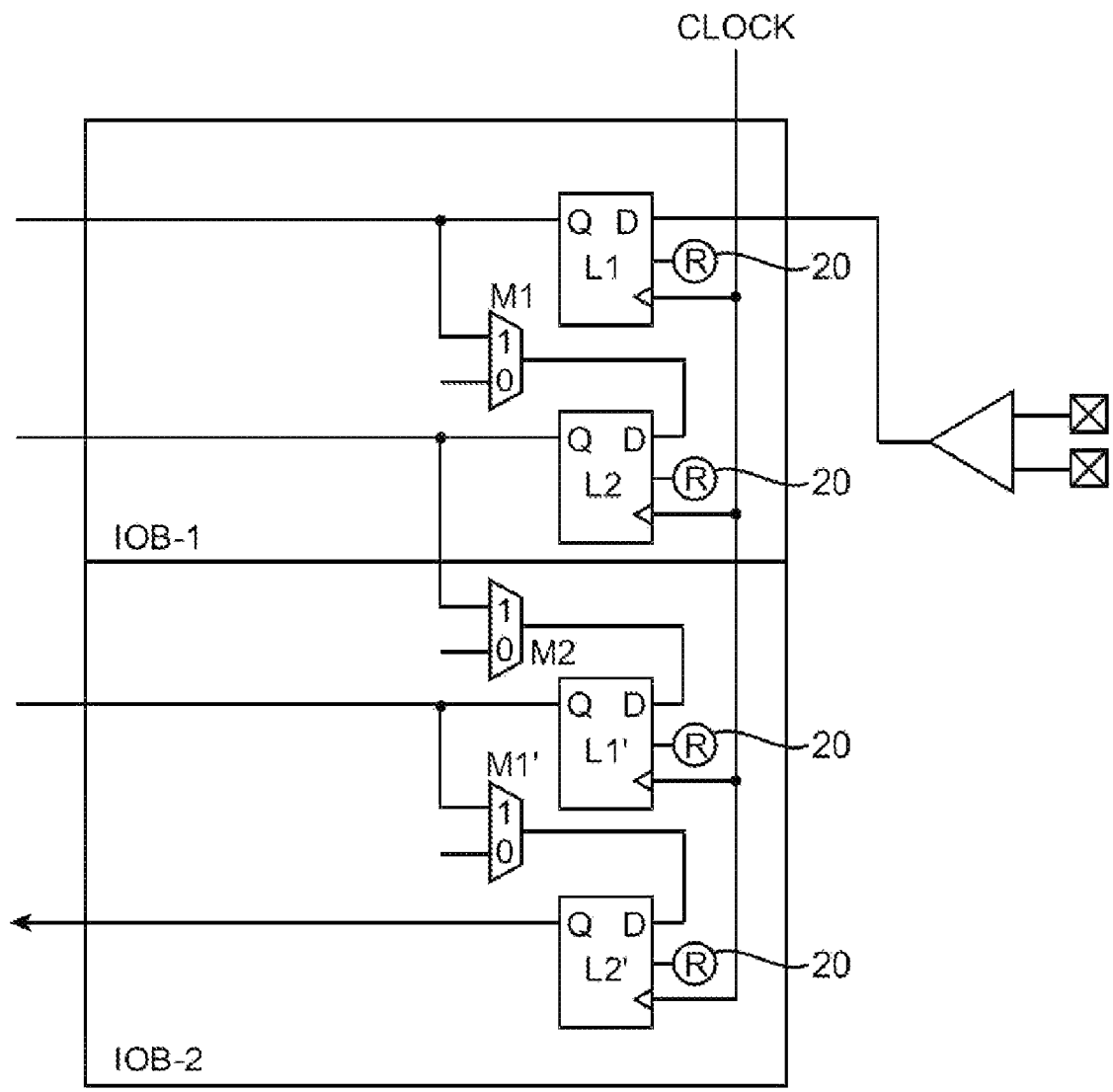

Another illustrative arrangement in which the data registers of two adjacent single-ended input-output circuit blocks can be selectively configured to form a 4:1 SERDES shift register for circuit 10 is shown in FIG. 8. In the example of FIG. 8, input-output blocks IOB-1 and IOB-2 may be placed into a single-ended mode in which each block handles single-ended input data or into a SERDES mode in which registers L1, L2, L1', and L2' are programmably interconnected using multiplexers M1, M2, and M1' to form a SERDES shift register. In the FIG. 8 example, data registers L1, L2, L1', and L2' are programmed to serve as positive edge triggered registers during SERDES mode (e.g., by loading logic ones into programmable elements 20).

The programmable multiplexer circuitry and data registers of the single-ended input-output circuits may be used to form shift registers for SERDES circuits in both the data input path (e.g., as with SERDES circuit 50 of FIG. 2) and the data output path (e.g., as with SERDES circuit 34 of FIG. 2).

Figure 9:
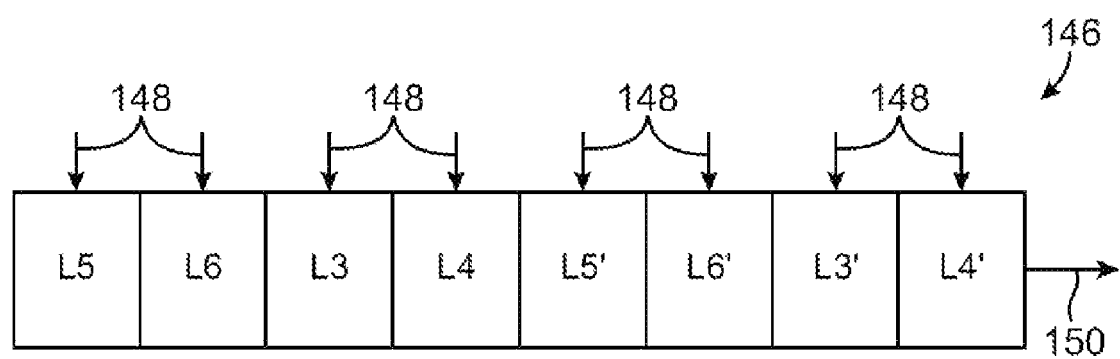

An illustrative configuration into which the data registers of single-ended input-output circuit 88 (FIG. 4) may be placed when forming a SERDES shift register for serializing transmitted data is shown in FIG. 9. As shown in FIG. 9, 8:1 SERDES shift register 146 may be formed in SERDES mode by connecting the data registers of circuitry 88 in the following order: L5, L6, L3, L4, L5', L6', L3', and L4'. The shift register may be used to perform the SERDES functions of a circuit such as SERDES circuit 34 of FIG. 2. In SERDES mode, data from parallel paths 148 (e.g., paths such as paths 54 of FIG. 2) may be converted from parallel to serial format. Corresponding serialized data may be supplied on output 150 (e.g., a path such as path 68 of FIG. 2). This data may then be converted from single-ended to differential data and transmitted (e.g., using a differential transmitter such as transmitter 36 of FIG. 2).

Figure 10:
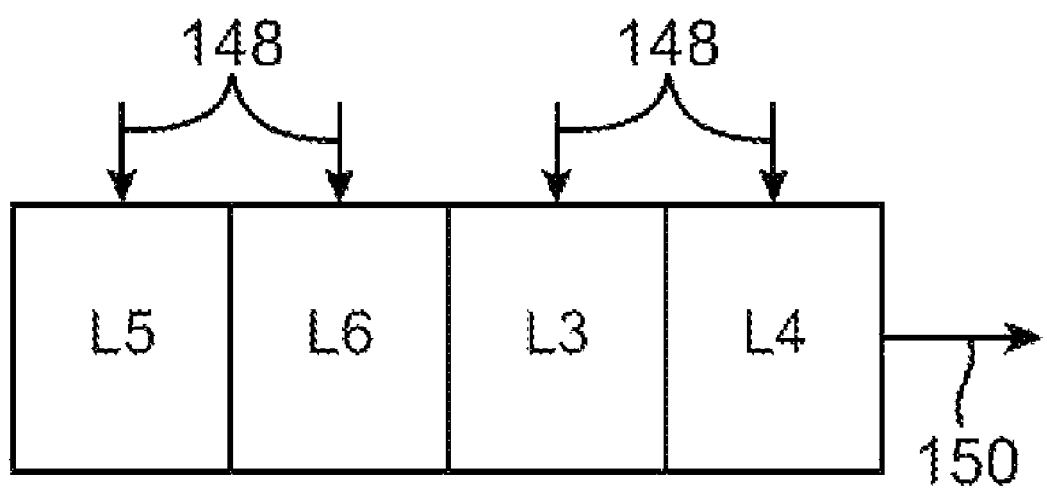

Shift registers for SERDES circuits in the output data path associated with a differential transmitter (such as transmitter 36 of FIG. 2) may be formed in any suitable size. In the example of FIG. 9, an 8:1 shift register was formed in SERDES mode. In the example of FIG. 10, a 4:1 shift register has been formed by selectively programming multiplexer and data register circuitry in single-ended input-output circuitry such as input-output circuitry 88 so that registers L5, L6, L3, and L4 are connected in series.

Figure 11:
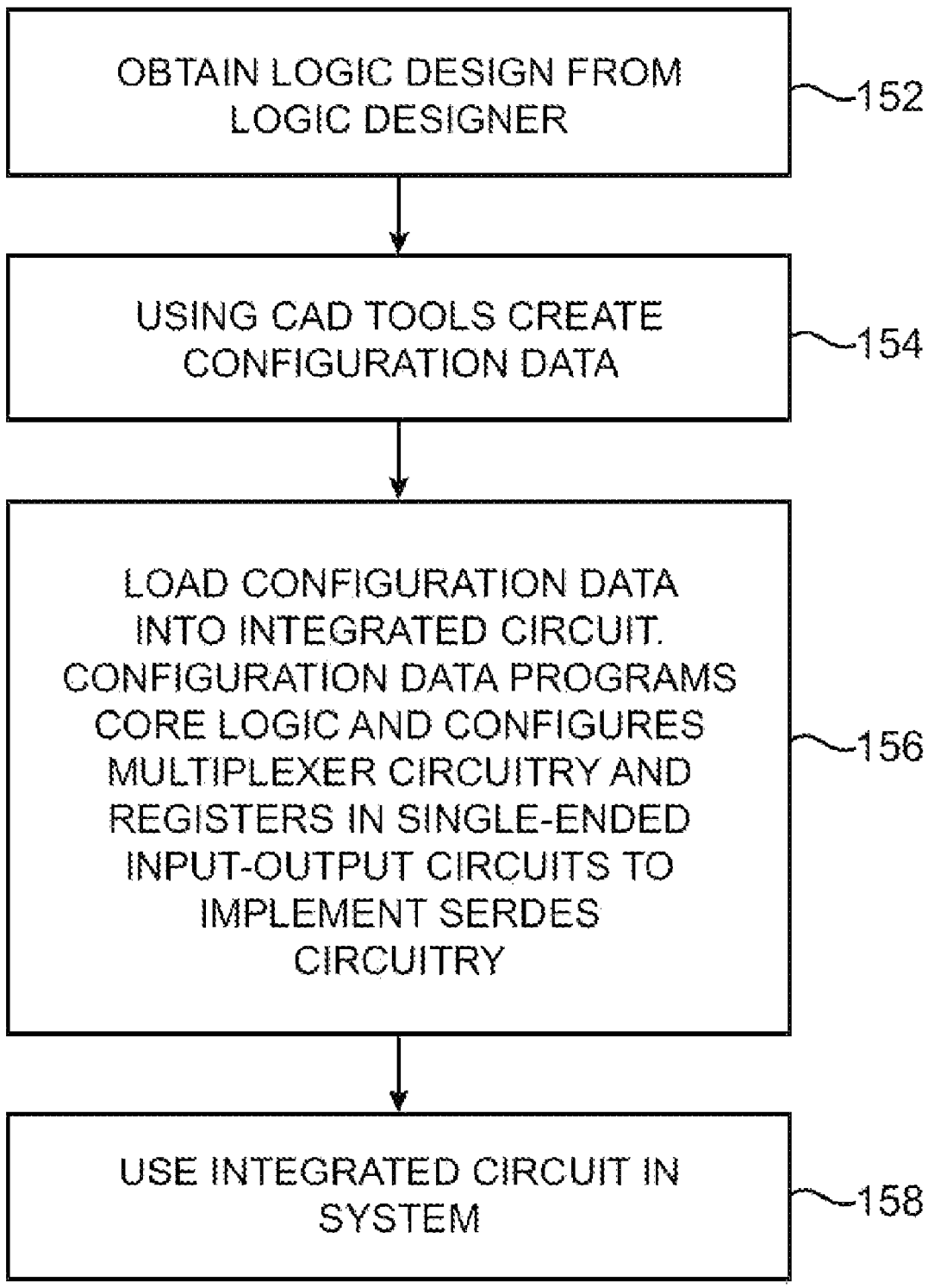
FIG. 11 is a flow chart of illustrative steps involved in configuring input-output circuitry on an integrated circuit to implement serializer-deserializer shift registers in accordance with an embodiment of the present invention.

Illustrative steps involved in configuring programmable routing circuitry such as programmable multiplexer circuitry (e.g., multiplexers M1, M1', etc.) and programmable data registers (e.g., data registers L1, L1', etc.) to form SERDES shift registers such as registers 56 and 42 of FIG. 2 are shown in FIG. 11.

At step 152, a logic design for a desired logic circuit is obtained from a logic designer. The logic design may contain one or more required input-output circuit SERDES shift registers or may contain no required input-output circuit SERDES shift registers.

During step 152, the logic designer may supply the logic design to computer-aided design (CAD) tools using design and constraint entry tools. The design and constraint entry tools may allow the logic designer to provide a logic design to the CAD tools using a hardware description language such as Verilog hardware description language (HDL) or Very High Speed Integrated Circuit Hardware Description Language (VHDL). The logic designer can also enter the logic design by writing hardware description language code with an editor. Blocks of code may be imported from user-maintained or commercial libraries if desired.

After the design has been obtained by the CAD tools, the CAD tools may produce corresponding configuration data for loading into programmable elements such as programmable elements 20 of FIG. 1 in integrated circuit 10 (step 154). The configuration data creation operations of step 154 may involve using behavioral simulation tools to simulate the functional performance of the logic design. The output of the behavioral simulation tools may be provided to the logic designer in any suitable format (e.g., truth tables, timing diagrams, etc.).

Once the functional operation of the logic design has been determined to be satisfactory, logic synthesis and optimization tools may be used to implement the logic design in a particular integrated circuit (i.e., in the logic and interconnect resources of a particular programmable logic device product or product family).

The design may be optimized by making appropriate selections of hardware to implement different logic functions in the logic design based on the logic design data and constraint data (e.g., constraint data supplied by the logic designer using the CAD tools).

After logic synthesis and optimization using the CAD tools, placement and routing tools in the CAD tools may be used to perform physical design steps (layout synthesis operations). Placement and routing tools may be used to determine how to place the circuits for each logic function within the programmable logic device or other integrated circuit.

During the operations of step 154, configuration data is created that will configure multiplexer circuitry and registers in the single-ended input-output circuits of device 10 so that the single-ended input-output circuitry operates in a single-ended data signal mode or in SERDES mode, as described in connection with FIG. 4.

At step 156, the configuration data that was created at step 154 may be loaded into integrated circuit 10 (e.g., into programmable elements 20 in a programmable logic device integrated circuit). The programmable elements 20 configure associated logic components in programmable logic 18. Programmable multiplexers (e.g., multiplexers M1, M1', etc.) and programmable data registers (e.g., registers L1, L1', etc.) may be configured by the configuration data loaded into associated programmable elements. If desired, some of the data registers may be configured using hardwired connection to conserve programmable elements 20. For example, registers L1, L1', L3, and L3' in the example of FIG. 4 may be permanently configured as positive-edge triggered registers (as an example).

When the configuration data is loaded into the integrated circuit in step 156, the single-ended input-output circuitry of the integrated circuit is configured to operate in single-ended mode or is configured to operate in SERDES mode. In single-ended mode, the single-ended input-output circuitry may perform functions such as single data rate to double data rate conversion and double data rate to single data rate conversion. In SERDES mode, the programmable multiplexers and routing paths such as path 120 of FIG. 4 (or other suitable programmable routing circuitry) are configured to connect appropriate data registers into a chain. Selectively forming shift registers in this way allows SERDES functions to be implemented only when needed, thereby conserving resources.

The SERDES shift registers that are selectively formed during step 156 may be used to serialize parallel data that is being transmitted. For example, a SERDES shift register may serialize parallel data received from core logic. The serialized parallel data can then be converted from single-ended data to differential data and transmitted over a differential communications path using an LVDS transmitter or other differential transmitter such as transmitter 36 of FIG. 2. The SERDES shift registers that are formed during step 156 may also be used to perform serial-to-parallel data conversion on serial data that has been received by an LVDS receiver or other differential receiver such as differential receiver 48 of FIG. 2. Following serial-to-parallel conversion, the data can be provided to core logic on device 10 in parallel.

After device 10 has been configured at step 156, device 10 may be used in a system (step 158).

The foregoing is merely illustrative of the principles of this invention and various modifications can be made by those skilled in the art without departing from the scope and spirit of the invention.

What is claimed is:

1. Input-output circuitry that serves as an interface between core logic and input-output pins on an integrated circuit, comprising:
   a plurality of data registers;
   programmable circuitry that is configured to connect the data registers to form a serializer-deserializer shift register;
   single-ended data input-output circuitry containing the plurality of data registers; and
   differential signaling input-output circuitry.

2. The input-output circuitry defined in claim 1 wherein the programmable circuitry comprises programmable multiplexer circuitry.

3. Input-output circuitry that serves as an interface between core logic and input-output pins on an integrated circuit, comprising:
   a plurality of data registers;
   programmable circuitry that is configured to connect the data registers to form a serializer-deserializer shift register, wherein the plurality of data registers comprise programmable data registers that are selectively configured as positive-edge-triggered registers or negative-edge-triggered registers.

4. The input-output circuitry defined in claim 3 wherein the programmable circuitry comprises programmable multiplexer circuitry.

5. The input-output circuitry defined in claim 1 wherein the differential signaling input-output circuitry comprises:
   differential transmitter circuitry, wherein the serializer-deserializer shift register converts parallel data to serial data that is transmitted through a pair of the input-output pins by the differential transmitter circuitry.

6. The input-output circuitry defined in claim 1 wherein the differential signaling input-output circuitry comprises:
   differential receiver circuitry that receives differential input data from a pair of the input-output pins and that produces corresponding single-ended serial data, wherein the serializer-deserializer shift register converts the serial data to parallel data.

7. The input-output circuitry defined in claim 1 wherein the differential signaling input-output circuitry comprises:
   differential transmitter circuitry, wherein the serializer-deserializer shift register converts parallel data to serial data that is transmitted through a pair of the input-output pins by the differential transmitter circuitry; and
   differential receiver circuitry that receives differential input data from the pair of input-output pins and that produces corresponding single-ended serial data, wherein the serializer-deserializer shift register converts the serial data to parallel data.

8. The input-output circuitry defined in claim 1 wherein the programmable circuitry comprises programmable multiplexer circuitry, wherein the single-ended data input-output circuitry comprises an output buffer and an output enable control circuit that controls the output buffer, and wherein the differential signaling input-output circuitry comprises:
   differential transmitter circuitry, wherein the serializer-deserializer shift register converts parallel data to serial data that is transmitted through a pair of the input-output pins by the differential transmitter circuitry; and
   differential receiver circuitry that receives differential input data from the pair of input-output pins and that produces corresponding single-ended serial data, wherein the serializer-deserializer shift register converts the serial data to parallel data.

9. A method for selectively configuring input-output circuit data registers to form a serializer-deserializer shift register, comprising:
   obtaining a logic design from a logic designer;
   creating configuration data corresponding to the logic design; and
   loading the configuration data into an integrated circuit to implement the logic design, wherein when the configuration data is loaded into the integrated circuit, the input-output circuit data registers are connected to form the serializer-deserializer shift register, wherein the input-output circuit data registers are contained within a programmable integrated circuit that has programmable elements and wherein loading the configuration data comprises loading the configuration data into the programmable elements.

10. The method defined in claim 9 wherein the input-output circuit data registers are contained within a single-ended data input-output circuit and wherein loading the configuration data comprises loading configuration data into programmable elements to configure the data registers in the single-ended data input-output circuit to form the serializer-deserializer shift register.

11. An integrated circuit comprising:
   input-output pins;
   core logic;
   input-output circuitry connected between the input-output pins and the core logic;
   a plurality of data registers in the input-output circuitry; and
   programmable circuitry in the input-output circuitry that is selectively configured to connect the data registers to form a serializer-deserializer shift register, wherein the plurality of data registers comprise programmable data registers that are selectively configured as positive-edge-triggered registers or negative-edge-triggered registers.

12. The integrated circuit defined in claim 11 wherein the programmable circuitry comprises programmable multiplexer circuitry.

13. An integrated circuit comprising:
   input-output pins;
   core logic;
   input-output circuitry connected between the input-output pins and the core logic;
   a plurality of data registers in the input-output circuitry;

programmable circuitry in the input-output circuitry that is selectively configured to connect the data registers to form a serializer-deserializer shift register;
single-ended data input-output circuitry containing the plurality of data registers; and
differential transmitter circuitry, wherein the serializer-deserializer shift register converts parallel data to serial data that is transmitted through a pair of the input-output pins by the differential transmitter circuitry.

14. An integrated circuit comprising:
input-output pins;
core logic;
input-output circuitry connected between the input-output pins and the core logic;
a plurality of data registers in the input-output circuitry;
programmable circuitry in the input-output circuitry that is selectively configured to connect the data registers to form a serializer-deserializer shift register;
single-ended data input-output circuitry containing the plurality of data registers; and
differential receiver circuitry that receives differential input data from a pair of the input-output pins and that produces corresponding single-ended serial data, wherein the serializer-deserializer shift register converts the serial data to parallel data.

15. The integrated circuit defined in claim 13 further comprising:
differential receiver circuitry that receives differential input data from the pair of input-output pins and that produces corresponding single-ended serial data, wherein the serializer-deserializer shift register converts the serial data to parallel data.

* * * * *